(12) United States Patent
Manthoulis

(10) Patent No.: US 9,838,750 B2
(45) Date of Patent: Dec. 5, 2017

(54) SYSTEM AND METHOD FOR RETRIEVING A PREVIOUSLY TRANSMITTED PORTION OF TELEVISION PROGRAM CONTENT

(75) Inventor: Orestis Manthoulis, Tiburon, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 1591 days.

(21) Appl. No.: 12/195,308

(22) Filed: Aug. 20, 2008

(65) Prior Publication Data

US 2010/0046927 A1 Feb. 25, 2010

(51) Int. Cl.
H04N 21/6408 (2011.01)
H04N 21/218 (2011.01)
H04N 21/472 (2011.01)
H04N 21/6405 (2011.01)

(52) U.S. Cl.
CPC ..... *H04N 21/6405* (2013.01); *H04N 21/2181* (2013.01); *H04N 21/47202* (2013.01); *H04N 21/6408* (2013.01)

(58) Field of Classification Search
None
See application file for complete search history.

(56) References Cited

U.S. PATENT DOCUMENTS

| | | |
|---|---|---|
| 5,708,654 A | 1/1998 | Arndt et al. |
| 5,850,386 A | 12/1998 | Anderson et al. |
| 6,192,404 B1 | 2/2001 | Hurst et al. |
| 6,337,861 B1 | 1/2002 | Rosen |
| 6,501,756 B1 | 12/2002 | Katsube et al. |
| 6,678,463 B1 | 1/2004 | Pierre et al. |
| 6,754,904 B1 | 6/2004 | Cooper et al. |
| 6,795,863 B1 | 9/2004 | Doty, Jr. |
| 6,862,622 B2 | 3/2005 | Jorgensen |
| 6,920,133 B1 | 7/2005 | Boodaghians |
| 6,958,998 B2 | 10/2005 | Shorey |
| 7,027,460 B2 | 4/2006 | Iyer et al. |
| 7,031,326 B1 | 4/2006 | Shur et al. |
| 7,082,129 B2 | 7/2006 | Cromer et al. |
| 7,126,944 B2 | 10/2006 | Rangarajan et al. |
| 7,293,066 B1 * | 11/2007 | Day ............................ 709/213 |

(Continued)

OTHER PUBLICATIONS

"Combining Cooperative P2P Multicast for IPTV Video-on-Demand," Vijay Gopalkrishnan et al., AT&t Labs—Research, 13 pages.

(Continued)

*Primary Examiner* — Michael Telan
(74) *Attorney, Agent, or Firm* — Guntin & Gust, PLC; Joseph Hrutka

(57) ABSTRACT

A system comprises a storage and a processor. The storage is for storing a plurality of Internet protocol multicast video streams, each associated with a live television program content. The processor is in communication with the storage, and the processor is configured to receive the Internet protocol multicast video streams. The processor is also configured to receive a request for a previously transmitted portion of one of the Internet protocol multicast video streams from customer premises equipment in response to the customer premises customer requiring the previously transmitted portion for display. The processor is also configured to begin transmission of the previously transmitted portion as an Internet protocol unicast video stream to the customer premises equipment for immediate display.

20 Claims, 7 Drawing Sheets

(56) References Cited

U.S. PATENT DOCUMENTS

| | | |
|---|---|---|
| 2003/0028889 A1 | 2/2003 | McCoskey et al. |
| 2003/0093544 A1* | 5/2003 | Richardson ............... 709/231 |
| 2003/0110274 A1 | 6/2003 | Pazi et al. |
| 2003/0188320 A1 | 10/2003 | Shing |
| 2003/0208771 A1 | 11/2003 | Hensgen et al. |
| 2003/0226150 A1 | 12/2003 | Berberet et al. |
| 2004/0128343 A1 | 7/2004 | Mayer |
| 2004/0131357 A1* | 7/2004 | Farmer et al. ............ 398/67 |
| 2004/0139170 A1 | 7/2004 | Shen et al. |
| 2004/0143850 A1 | 7/2004 | Costa |
| 2004/0151179 A1 | 8/2004 | Andre et al. |
| 2004/0267552 A1 | 12/2004 | Gilliam et al. |
| 2005/0004873 A1 | 1/2005 | Pou et al. |
| 2005/0004875 A1 | 1/2005 | Kontio et al. |
| 2005/0060572 A1 | 3/2005 | Kung et al. |
| 2005/0235047 A1* | 10/2005 | Li et al. ............ 709/219 |
| 2005/0283810 A1* | 12/2005 | Ellis et al. ............ 725/93 |
| 2006/0186926 A1 | 8/2006 | Yager et al. |
| 2006/0218620 A1 | 9/2006 | Nadarajah et al. |
| 2006/0268917 A1 | 11/2006 | Nadarajah |
| 2007/0009235 A1* | 1/2007 | Walters et al. ............ 386/112 |
| 2007/0101012 A1* | 5/2007 | Li et al. ............ 709/231 |
| 2007/0174471 A1 | 7/2007 | Van Rossum |
| 2007/0180465 A1 | 8/2007 | Ou et al. |
| 2007/0199041 A1 | 8/2007 | Noll et al. |
| 2007/0209052 A1 | 9/2007 | Taylor et al. |
| 2008/0002021 A1 | 1/2008 | Guo et al. |
| 2008/0059997 A1 | 3/2008 | Plotnick et al. |
| 2008/0307479 A1* | 12/2008 | Jones et al. ............ 725/115 |
| 2009/0089832 A1* | 4/2009 | Kendall ............ 725/38 |
| 2009/0313382 A1* | 12/2009 | Bouazizi ............ 709/231 |

OTHER PUBLICATIONS

"Start Over™," webpage describing free feature for Time Warner Cable Digital Cable Customers, Jul. 2008, http://www.timewarnercable.com/sanantonio/products/cable/start_over/default.html.

U.S. Appl. No. 12/163,282, filed Jun. 27, 2008.

U.S. Appl. No. 11/848,031, filed Aug. 30, 2007.

* cited by examiner

SYSTEM AND METHOD FOR RETRIEVING A PREVIOUSLY TRANSMITTED PORTION OF TELEVISION PROGRAM CONTENT

FIELD OF THE DISCLOSURE

The present disclosure generally relates to communications networks, and more particularly relates to a system and method for retrieving a previously transmitted portion of television program content.

BACKGROUND

Select digital video recorders (DVRs) can record a video stream as it is received at the DVR. A user of the DVR can then pause, rewind, and fast forward the recorded portions. Some set-top box devices that have an internal DVR that can also record a television program as it is output to a display device. The television program can be stored while the user is currently watching the television program. However, when a tuner in the set-top box device is changed to a different channel, the recorded content from the first television program is erased and content associated with a new television program is recorded. Thus, the user can rewind the television program to view a portion that he might have missed as long as the tuner of set-top box device receiving the television program has not been recently changed.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
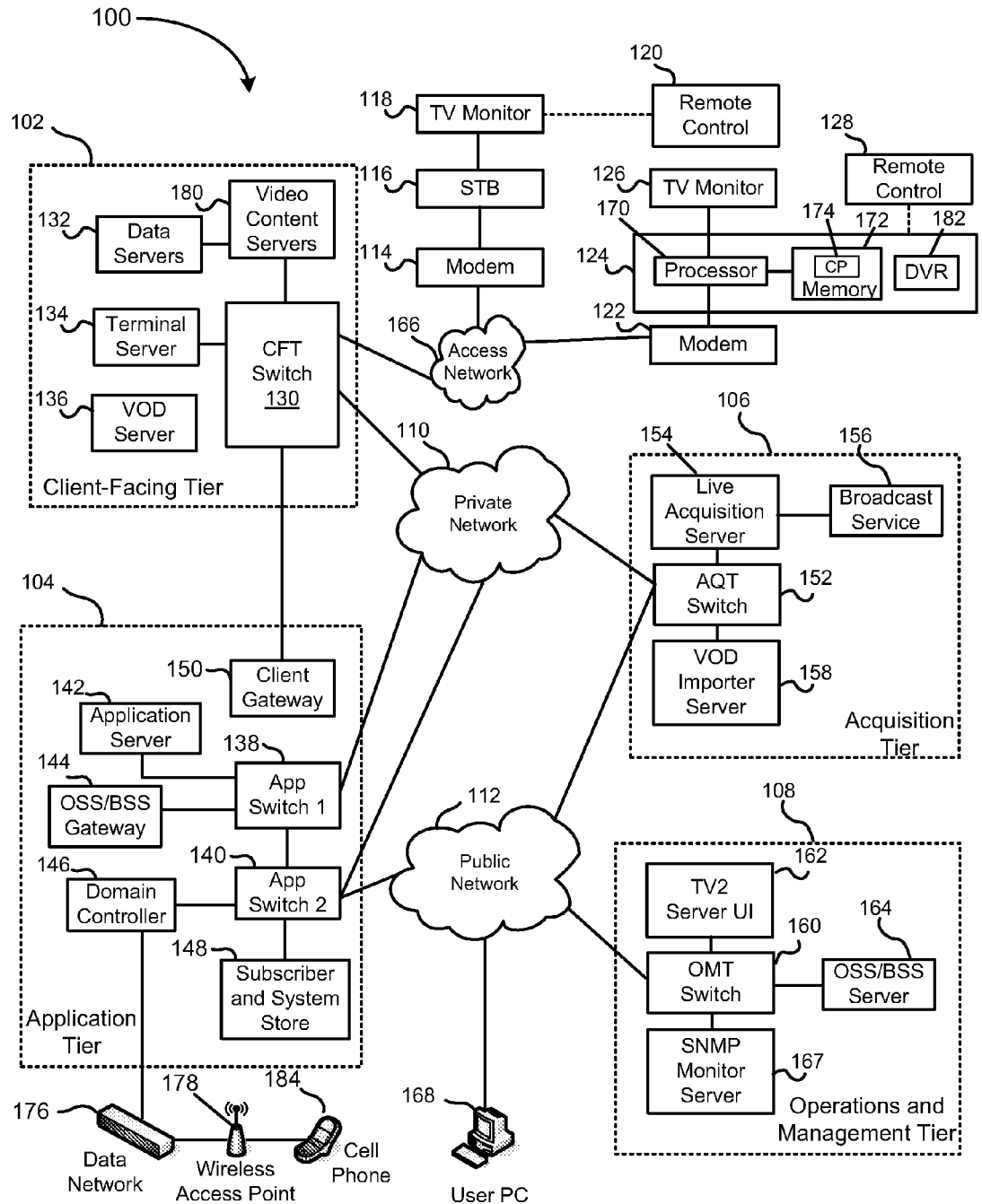
FIG. 1 is a block diagram illustrating an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the data servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The set-top box computer program 174 can contain instructions to receive many types of user preferences from the domain controller 146 via the access network 166. For example, the set-top box computer program 174 can include instructions to receive a request to record at least one television program at a video content storage module such as a digital video recorder (DVR) 182 within the second set-top box device 124. In this example embodiment, the set-top box computer program 174 can include instructions to transmit the request to the DVR 182, where the television program(s) are recorded. In an illustrative embodiment, the set-top box computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
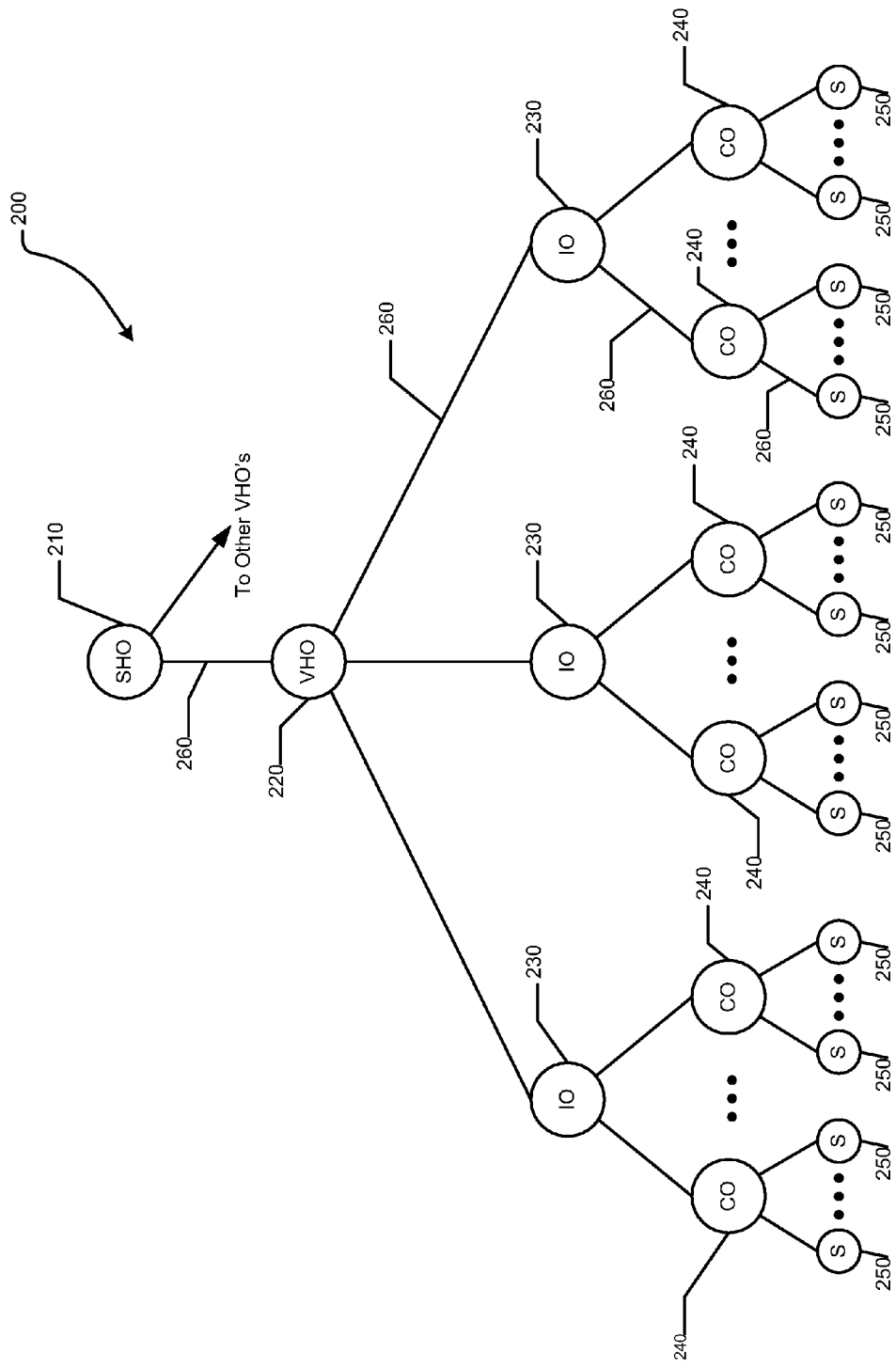
FIGS. 2, 3, and 4 are block diagrams illustrating an embodiment of an IPTV network.

FIG. 2 shows one example embodiment of a television distribution system or network 200, using IPTV technology in this example but not limited thereto, adapted to provide, among other things, the live television content features of the disclosed subject matter. The network 200 may include a super hub office (SHO) 210 for acquisition and encoding of video content, one or more video hub offices (VHO) 220 in each demographic market area (DMA), one or more intermediate offices (IO) 230, one or more central offices (CO) 240 located in each metropolitan area, and subscribers 250, who may be located in single or multiple dwelling units. In one example embodiment, the network 200 may be connected through a plurality of high speed communication links 260 using physical transport layers such as fiber, cable, twisted pair, air, or other media.

In one example embodiment of the IPTV video delivery system, the SHO 210 distributes content to one or more VHOs 220 which may be spread across a wide geographic territory, such as an entire country. The SHO 210 may, for example, be in a central location for acquisition and aggregation of national-level broadcast television (or linear) programming. A redundant SHO 210 may be provided for backup in case of failure. The SHO 210 may also provide the central point of live television content acquisition and insertion into the IPTV network. Linear programming may be received at the SHO 210 via satellite and processed for delivery to the VHO 220. Live television content may be received from various sources and processed/encoded to codec and bit-rate requirements for the communication network for transmission to the VHO 220 over the high speed communication links. The VHOs 220 are the video distribution points within each DMA or geographic region.

Figure 3:
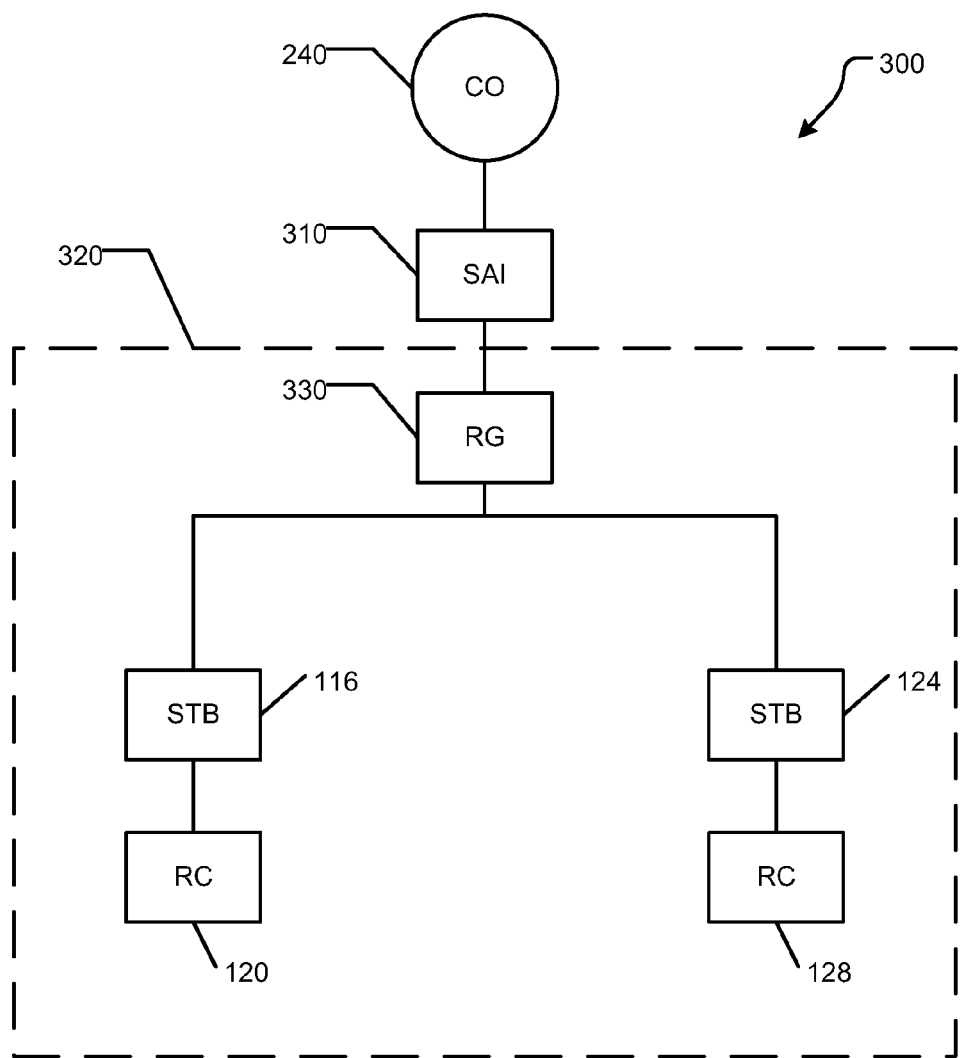

FIG. 3 shows an example network architecture 300 between the CO 240 and customer premises equipment (CPE) 320 of the subscriber 250 shown in FIG. 2. A serving area interface (SAI) 310 may be connected to the CO 240. SAI 310 may, for example, be located in a weather-proof enclosure proximate the subscriber 250 premises, and may include fiber-to-the-node (FTTN) equipment. FTTN equipment may also be located in the CO 240. The customer premises equipment (CPE) 320 includes, for example, a network interface device (not shown) and a residential gateway (RG) 330, with a built-in very-high-bit-rate digital subscriber loop (VDSL) modem or optical network termination (ONT). In either case the RG 330 may be connected to the rest of the home set-top box devices 116 and 124 via an internal network such as an Ethernet. The set-top box devices 116 and 124 each have an associated remote control device 120 and 128 which provides data entry to the set-top box devices to control the IPTV selections from the IPTV data streams.

Figure 4:
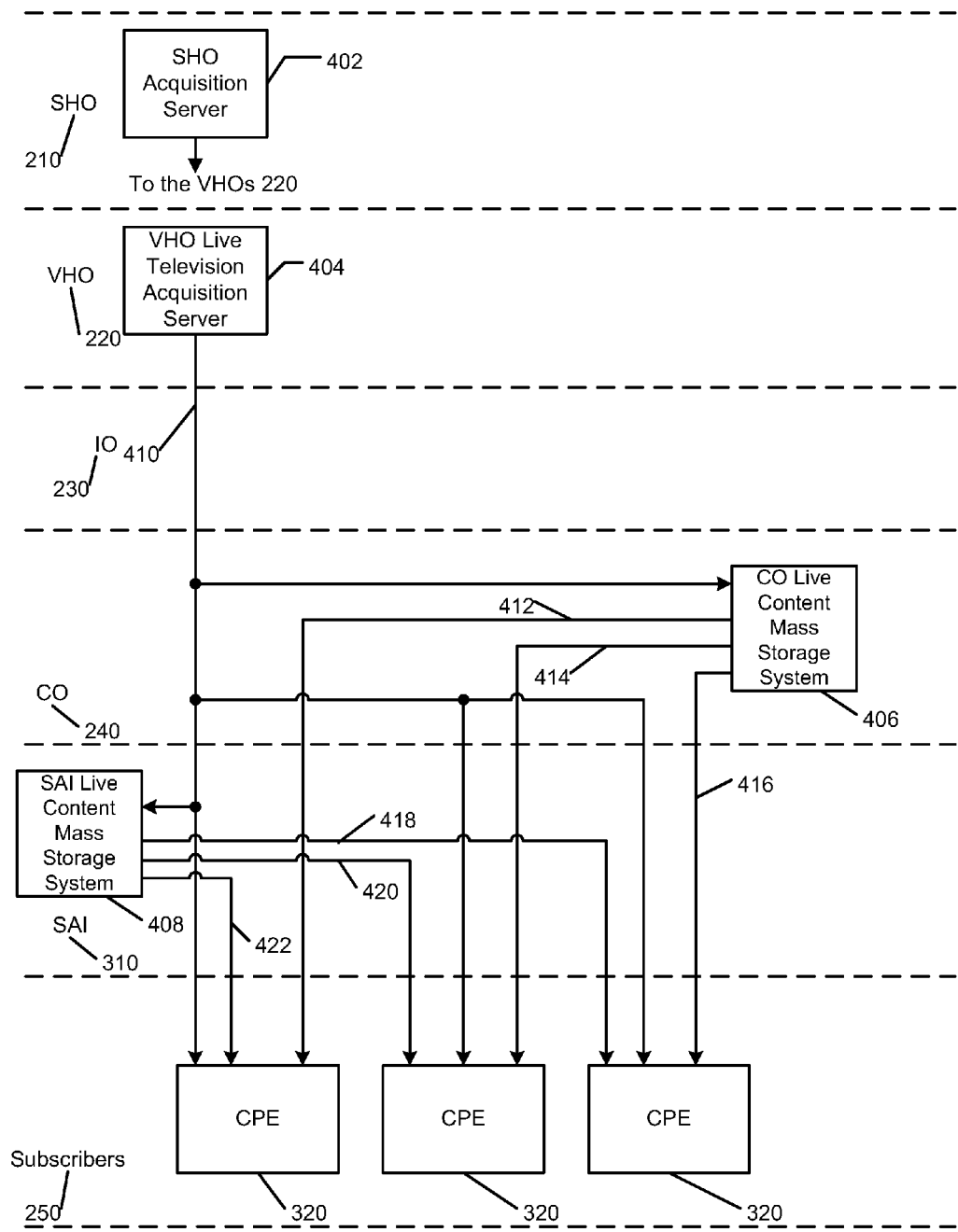

FIG. 4 shows one example embodiment of an SHO acquisition server 402, in the SHO 210, that may be used to acquire national content to be distributed towards the VHO 220. In an alternative embodiment, live television content may be acquired using an acquisition server in the VHO 220. In this configuration, the VHO 220 may include a VHO live television acquisition server 404, which forwards the live television and/or other content toward the subscribers 250 through the IO 230, the CO 240, and the SAI 310. The COs 240 can include a CO live content mass storage system 406, and the SAI 310 can include a SAI live content mass storage system 408. The IO 230 is connected to the CO 240, which is connected to the SAI 310 to further distribute traffic towards the subscribers 250. Traffic may reach the subscribers 250 at least partially via either FTTN or fiber to the premises (FTTP), or by other types of transmission medium.

The VHO live television acquisition server 404 may distribute a plurality of live television programs, each typically associated with a television "channel," using a multicast IP data stream 410 through the IO 230, CO 240, and SAI 310 to the subscribers 250. A live television program can include any television program that is scheduled to be provided to the subscribers 250 during a specific time period, such as a sports game, a television series, and the like. Additional routers, switches, and other network elements that would normally be present in the VHO 220, IO 230, CO 240, and SAI 310 are not shown in FIG. 4 in order to simplify the drawing. The number of programs or channels sent in the multicast stream may, without limitation, range up to 800 channels or more using present technology, with it being understood that advances in technology may allow many more channels to be sent. The multicast protocol allows for efficient distribution of these signals to a large number of subscribers 250.

As the plurality of live television programs are distributed using the multicast IP protocol data stream 410, the CO live content mass storage system 406 can receive and record multiple video streams, each associated with one of the plurality of live television programs. Additionally, the SAI live content mass storage system 408 can also receive and record each of the plurality of live television programs. In an embodiment, the CO live content mass storage system 406 can be part of a server located at the CO 240 or can be an external storage device in communication with the server. Similarly, the SAI live content mass storage system 408 can be part of a server located at the SAI 310 or can be an external storage device in communication with the server. Each of the video streams associated with one of the plurality of live television programs can be recorded in the live content mass storage systems 406 and 408 until the completion of the related live television program, upon which the video stream can be replaced by a new video stream of a different live television program.

When the subscriber 250 turns on the CPE 320 and the display device 126, the subscriber may receive one of the plurality of live television programs from the multicast IP protocol data stream 410. The live television program may have already begun, however, and the subscriber 250 may want to view a portion of the live television program that has already been transmitted to the subscriber by the VHO live television acquisition server 404. The subscriber 250 can then use the CPE 320 to request the already transmitted portion of the live television program from either the CO live content mass storage system 406 or the SAI live content mass storage system 408 after the already transmitted portion of the live television program is required for display by the CPE 320. Upon receiving a request for the already transmitted portion of the live television program, the CO live content mass storage system 406 can provide the previously transmitted content to the subscribers 250 using one of a plurality of unicast streams 412, 414, and 416. Similarly, the SAI live content mass storage system 408 can provide the previously transmitted content to the subscribers 250 using one of a plurality of unicast streams 418, 420, and 422.

The subscriber 250 can utilize the CPE 320 to initiate a unicast connection to a content library file on the CO live content mass storage system 406 or the SAI live content mass storage system 408. Upon the CPE 320 completing the unicast connection, the subscriber 250 can request to advance the video stream forwards and backwards to view a desired portion of the recorded content associated with the previously transmitted live television program. In an embodiment, the CPE 320 can also download the entire portion of the live television program recorded on the CO live content mass storage device 406 using one of the plurality of unicast streams 412, 414, and 416. Likewise, if the live television program content is recorded on the SAI live content mass storage system 408, the CPE 320 can download the entire portion of the live television program recorded on the SAI live content mass storage system using one of the plurality of unicast streams 418, 420, and 422.

While the subscriber 250 is accessing the portion of the live television content recorded on the live content mass storage systems 406 and 408, the VHO live television acquisition server 404 can continue to transmit the live television program to the CPE 320 using the multicast IP protocol data stream 410. The CPE 320 can record the current portion of the live television program, received from the VHO live television acquisition server 404, in a storage device of the CPE (not shown) for later access by the subscriber 250. Thus, the subscriber 250 can access a previously transmitted portion of a live television program content, can record the currently transmitted live television program content in the CPE 320 while accessing the previously transmitted portion, and can view the portion of the live television program content recorded in the CPE after viewing the previously transmitted portion.

Figure 5:
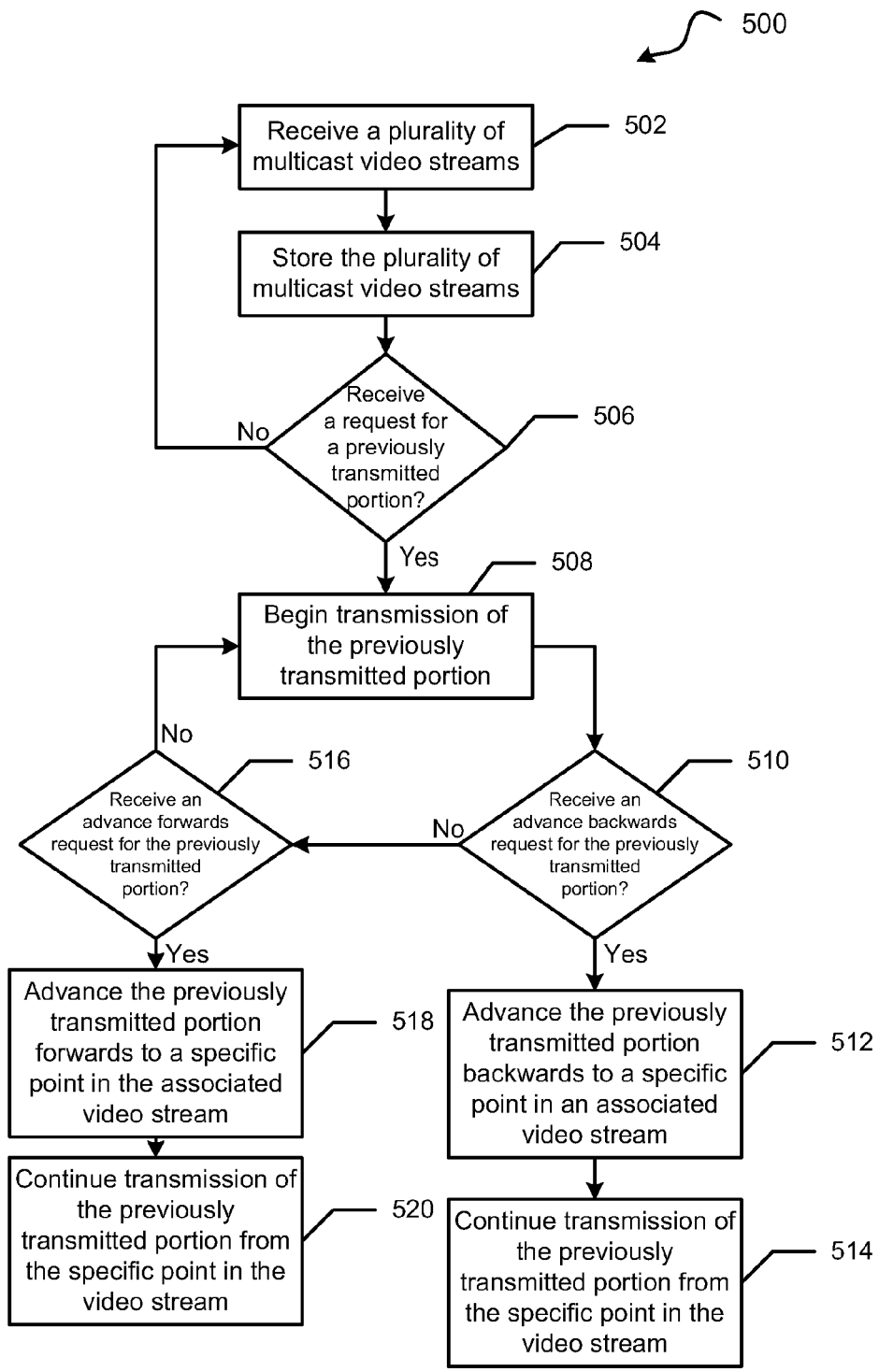
FIG. 5 is a flow diagram of a method for providing a unicast video stream associated with a previously transmitted portion of a multicast video stream.

The live content mass storage systems 406 and 408 can record the plurality of multicast video streams received from the VHO live television acquisition server 404 and can send a previously transmitted portion to the subscriber 250 as a unicast video stream. FIG. 5 shows a flow diagram of a method 500 for providing a unicast video stream associated with a previously transmitted portion of a multicast video stream. At block 502, a plurality of multicast video streams is received from the VHO live television acquisition server. Each of plurality of multicast video streams are associated with different live television program content. Each of the plurality of multicast video streams are stored at block 504. A block 506, a determination is made whether a request for a previously transmitted portion of one of the plurality of multicast video streams is received. If the request is not received, the flow diagram continues as stated above at block 502. If the request is received, the previously transmitted portion is sent at block 508. The previously transmitted portion can be sent to a subscriber as a unicast video stream.

At block 510, a determination is made whether an advance backwards request for the previously transmitted portion is received. If the advance backwards request is received, the previously transmitted portion is advanced backwards to a specific point in an associated video stream at block 512. At block 514, the transmission of the previously transmitted portion is continued from the specific point in the video stream. At block 516, if an advance backwards request is not received, a determination is made whether an advance forwards request is received for the previously transmitted portion. If the advance forwards request is not received, the flow diagram continues as stated above at block 508. If the advance forwards request is received, the previously transmitted portion is advanced forwards to a specific point in an associated video stream at block 518. At block 520, the transmission of the previously transmitted portion is continued from the specific point in the video stream.

Figure 6:
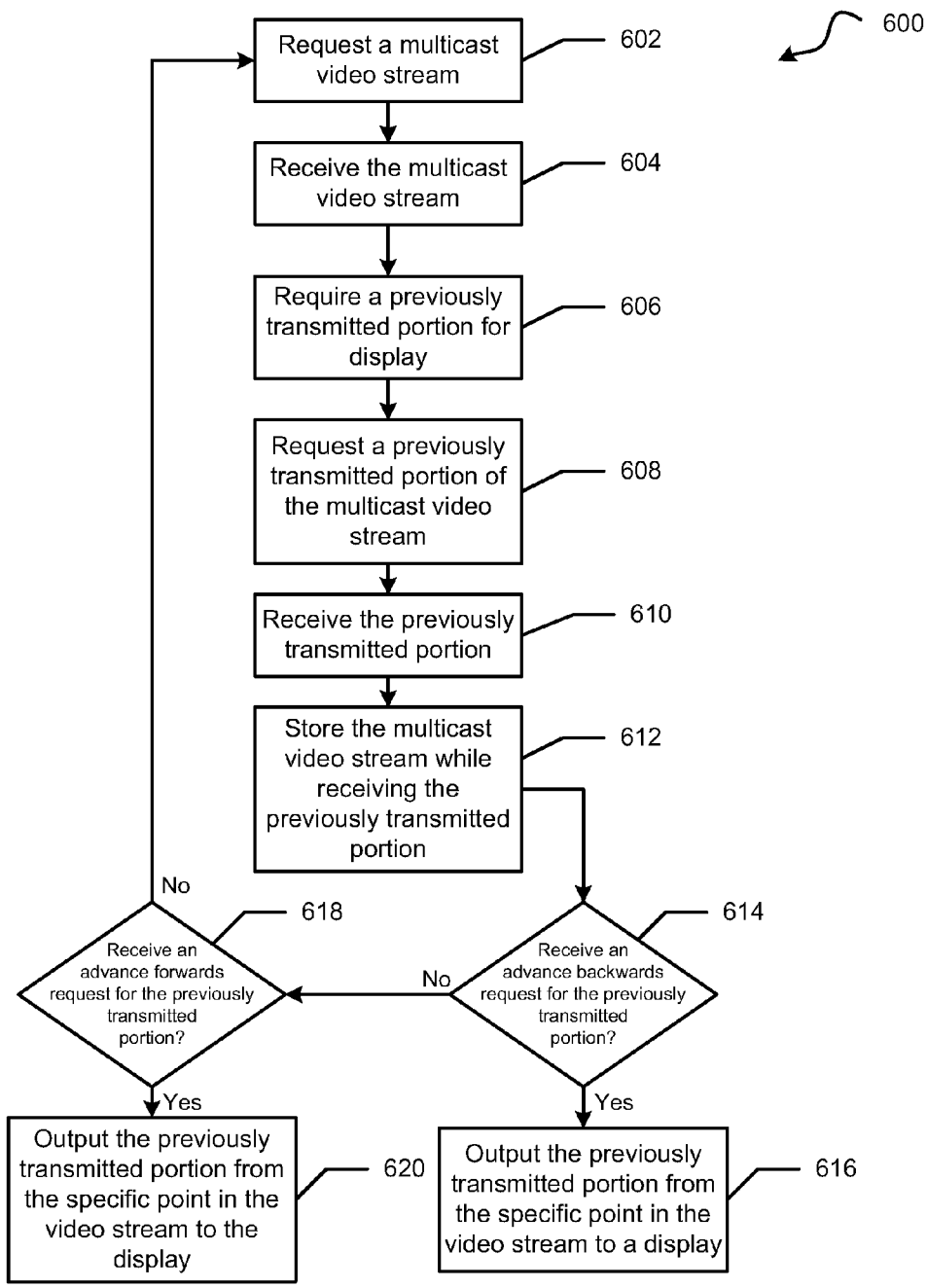
FIG. 6 is a flow diagram of a method for receiving the unicast video stream while recording a current portion of the multicast video stream.

The CPE 320 and the set-top box devices 116 and 124 can request a unicast video stream associated with a previously transmitted portion of live television program content from the live content mass storage systems 406 and 408. FIG. 6 shows a flow diagram of a method 600 for receiving the unicast video stream while storing a current portion of the multicast video stream. At block 602, a multicast video stream associated with live television program content is requested. The multicast video stream is received at block 604. At block 606, a previously transmitted portion of the multicast video stream is required for immediate output to a display. At block 608, the previously transmitted portion of the multicast video stream is requested. The previously transmitted portion is received as a unicast video stream at block 610. At block 612, the multicast video stream is stored in customer premises equipment while receiving the previously transmitted portion.

At block 614, a determination is made whether an advance backwards request for the previously transmitted portion is received. If the advance backwards request is received, the previously transmitted portion is output from a specific point in the video stream to the display at block 616. At block 618, if an advance backwards request is not received, a determination is made whether an advance forwards request is received for the previously transmitted portion. If the advance forwards request is not received, the flow diagram continues as stated above at block 602. If the advance forwards request is received, the previously transmitted portion is output from the specific point in the video stream to the display at block 620.

Figure 7:
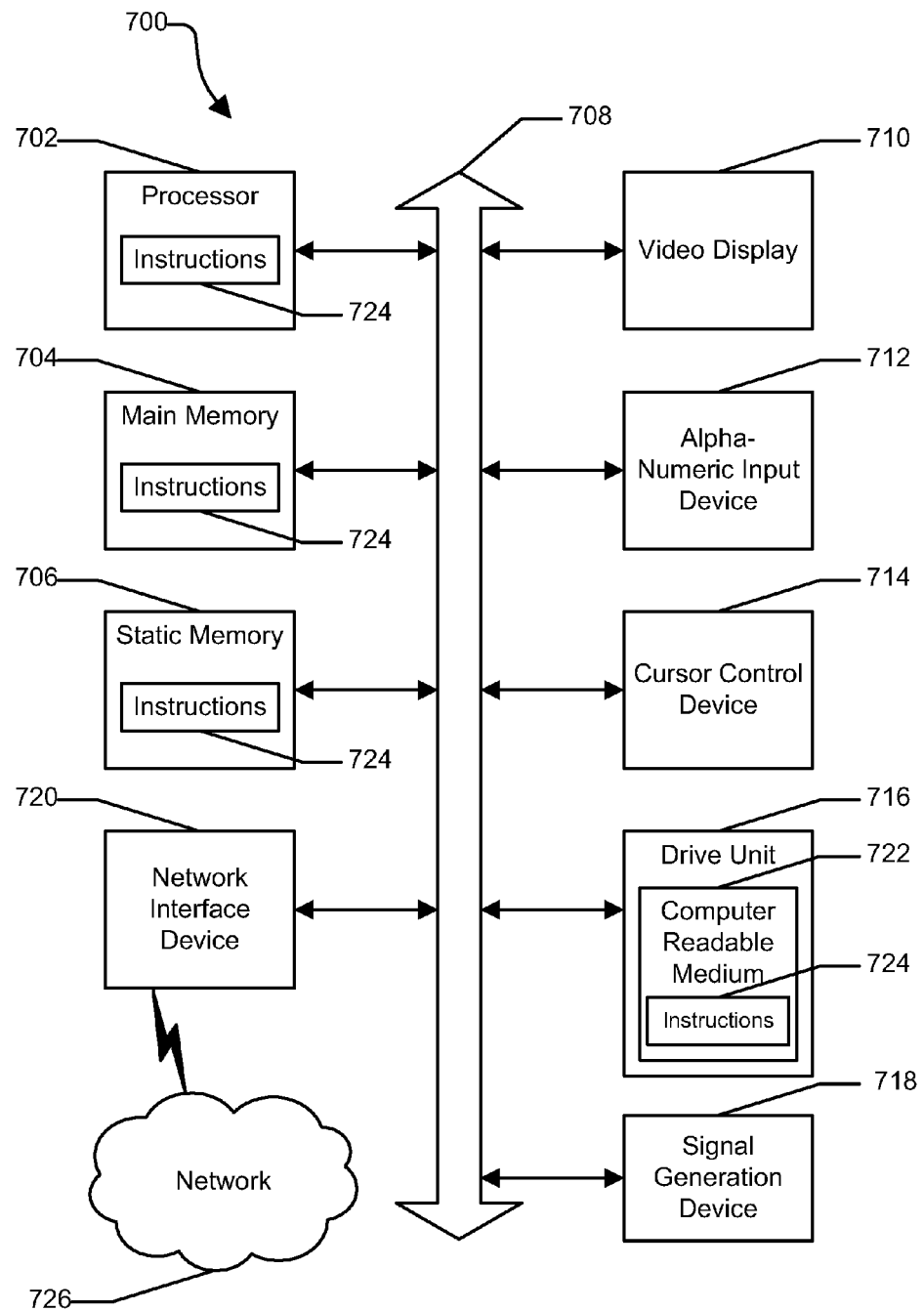
FIG. 7 is a block diagram of a general computer system.

FIG. 7 shows an illustrative embodiment of a general computer system 700 in accordance with at least one embodiment of the present disclosure. The computer system 700 can include a set of instructions that can be executed to cause the computer system to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
   a processing system including a processor;
   a storage that stores a plurality of multicast video streams from a video head end server, each associated with a scheduled video program content; and
   a memory in communication with the storage that stores executable instructions that, when executed by the processing system, facilitate performance of operations, comprising:
      receiving the plurality of multicast video streams;
      transmitting instructions, to one of a serving area interface or a central office, to store each program of the plurality of multicast video streams in the one of the serving area interface or the central office of an interactive television system while each program is being broadcast, wherein the serving area interface is proximate to a customer premises equipment and remote from the video head end server, and wherein the serving area interface services multiple premises having set top boxes and the central office services multiple service area interfaces;
      transmitting instructions, to one of the serving area interface or the central office, to delete a program of one of the multicast video streams once a broadcast of the program has been completed;
      transmitting, to a set top box, a multicast stream of the plurality of multicast streams, wherein the multicast stream corresponds to a first scheduled video program content, wherein the first scheduled video program content is associated with a first channel;
      receiving an automatic request, from the set top box, for a previously transmitted portion of the first scheduled video program content as a requested portion; and
      transmitting instructions to the serving area interface or the central office to transmit the requested portion of the previously transmitted portion as a unicast video stream while continuing the transmitting of the multicast stream of the first scheduled video program content to the set top box.

2. The system of claim 1, wherein the operations further comprise:
   receiving an advance backwards request for the previously transmitted portion;
   advancing the previously transmitted portion backwards to a specific point in a video stream of the previously transmitted portion based on the advance backwards request; and
   continuing transmission of the previously transmitted portion as the unicast video stream from the specific point in the video stream of the previously transmitted portion.

3. The system of claim 1, wherein the operations further comprise:
   receiving an advance forwards request for the previously transmitted portion;
   advancing the previously transmitted portion forward to a specific point in a video stream of the previously transmitted portion based on the advance forwards request; and
   continuing transmission of the previously transmitted portion as the unicast video stream from the specific point in the video stream of the previously transmitted portion.

4. The system of claim 1, wherein the set top box automatically accesses recorded content to output the first scheduled video program content responsive to detecting a second channel change back to the first channel, and wherein the transmitting the instructions to the serving area interface or the central office to transmit to the set top box the requested portion of the previously transmitted portion as the unicast video stream occurs while the set top box continues to automatically record the first scheduled video program content.

5. A set-top box device, comprising:
   a processing system including a processor; and
   a memory that stores executable instructions that, when executed by the processing system, facilitate performance of operations, comprising:

buffering scheduled video content from a selected channel from a multicast video stream received from an interactive television network as buffered television program content;

outputting the buffered television program content to output scheduled video content to a display;

receiving a request to display a requested portion of the scheduled video content;

determining whether the set top box has the requested portion among the buffered television program content;

requesting a previously transmitted portion of the selected channel corresponding to the requested portion of the scheduled video content from a live content storage system that comprises a serving area interface of the interactive television network that stores scheduled video programs of the multicast video stream of the interactive television network while each of the scheduled video programs of the multicast video stream is being broadcast, wherein the serving area interface is proximate to customer premises equipment and remote from the interactive television network, and wherein the serving area interface services multiple premises having set top boxes; and receiving an entire portion of the previously transmitted portion corresponding to the requested portion as a unicast video stream from the live content storage system while receiving the multicast video stream upon requesting the previously transmitted portion for presentation from the serving area interface.

6. The set-top box device of claim 5 wherein the operations further comprise storing the multicast video stream while receiving the previously transmitted portion.

7. The set-top box device of claim 6 wherein the operations further comprise:
receiving an advance backwards request for the previously transmitted portion; and
outputting the previously transmitted portion from a specific point in a video stream of the previously transmitted portion based on the advance backwards request to a display.

8. The set-top box device of claim 6 wherein the operations further comprise:
receiving an advance forwards request for the previously transmitted portion; and
outputting the previously transmitted portion from a specific point in a video stream of the previously transmitted portion based on the advance forwards request to a display.

9. The set-top box device of claim 5, wherein the operations further comprise:
receiving the requested portion of the previously transmitted portion as the unicast video stream while recording the first scheduled video program content.

10. The set-top box device of claim 5, wherein the live content storage system deletes a scheduled video program of the scheduled video programs of the multicast video stream once a broadcast of the scheduled video program has been completed.

11. A method, comprising:
receiving, by a processing system comprising a processor, a plurality of multicast video streams, each associated with live buffered scheduled video content from a video head end server;
transmitting, by the processing system, instructions to a storage location to store each of the plurality of multicast video streams while each live buffered scheduled video content is being broadcast, wherein the storage location is proximate to customer premises equipment for a geographic area of subscribers and remote from the video head end server;
transmitting, by the processing system, instructions to the storage location to delete a live buffered scheduled video content of one of the plurality of multicast video streams once a broadcast of the live buffered scheduled video content has been completed;
providing, by the processing system, the live buffered scheduled video content to the customer premises equipment, as recorded content;
receiving, by the processing system, an automatic request for a previously transmitted portion of the recorded content from the customer premises equipment; and
transmitting, by the processing system, instructions to the storage location to transmit an entire portion of the live buffered scheduled video content corresponding to and including the previously transmitted portion as a unicast video stream to the customer premises equipment for presentation while the processing system continues transmitting a multicast video stream corresponding to the live buffered scheduled video content of the one of the plurality of multicast video streams.

12. The method of claim 11, wherein the customer premises equipment receives an advance backwards request for the previously transmitted portion, wherein the customer premises equipment advances the previously transmitted portion backwards to a specific point in a video stream of the previously transmitted portion responsive to the advance backwards request.

13. The method of claim 11, wherein the customer premises equipment receives an advance forwards request for the previously transmitted portion, wherein the customer premises equipment advances the previously transmitted portion forward to a specific point in a video stream of the previously transmitted portion responsive to the advance forwards request.

14. The method of claim 11, wherein the storage location comprises a serving area interface connected to a central office of an interactive television system.

15. The method of claim 14, wherein the customer premises equipment records the live buffered scheduled video content, and wherein the serving area interface of the interactive television system is located in a weather-proof enclosure proximate to the customer premises equipment.

16. A method, comprising:
receiving, by a processing system comprising a processor, a multicast video stream of an interactive television system;
recording, by the processing system, a scheduled program of the multicast video stream as recorded channel information;
receiving, by the processing system, a request for a trick play of the recorded channel information as a trick play request;
requesting, by the processing system, a requested portion from one of a serving area interface or a central office of the interactive television system, wherein a live scheduled program of each scheduled program of the multicast video stream is stored at the serving area interface or the central office, and wherein the serving area interface or the central office are proximate to a geographic area serving multiple set-top boxes including the processing system while being remote from a head end server of the interactive television system;

receiving, by the processing system, an entire portion of a live scheduled program of the multicast video stream corresponding to and including the requested portion as a unicast video stream selectively from one of the serving area interface or the central office as a previously transmitted portion;

outputting, by the processing system, the previously transmitted portion to a display according to the trick play request; and storing the multicast video stream while receiving and outputting the previously transmitted portion.

17. The method of claim 16, wherein the trick play request comprises an advance backwards request for the previously transmitted portion, and wherein the method further comprises outputting the previously transmitted portion from a specific point in a video stream of the previously transmitted portion based on the advance backwards request to the display.

18. The method of claim 16, wherein the trick play request comprises receiving an advance forwards request for the previously transmitted portion and wherein the method further comprises outputting the previously transmitted portion from a specific point in a video stream of the previously transmitted portion based on the advance forwards request to the display.

19. The method of claim 16, wherein the serving area interface or the central office transmit the requested portion of the previously transmitted portion as the unicast video stream while the recording the scheduled program continues.

20. The method of claim 16, wherein the serving area interface is located in a weather-proof enclosure.

\* \* \* \* \*